United States Patent [19]
Horsting et al.

[11] 4,095,876
[45] Jun. 20, 1978

[54] LIQUID CRYSTAL DEVICE AND METHOD FOR PREPARING SAME

[75] Inventors: Carel Willem Horsting, W. Millington; William Bernard Hall, Stockton, both of N.J.

[73] Assignee: RCA Corporation, New York, N.Y.

[21] Appl. No.: 638,849

[22] Filed: Dec. 8, 1975

[51] Int. Cl.² ............................................. G02F 1/13
[52] U.S. Cl. ...................................... 350/343; 357/71
[58] Field of Search ................... 350/160 LC; 351/71

[56] References Cited

U.S. PATENT DOCUMENTS

| | | | |
|---|---|---|---|
| 3,799,649 | 3/1974 | Carlyle | 350/160 LC |
| 3,926,747 | 12/1975 | Newby et al. | 357/71 UX |
| 3,939,556 | 2/1976 | Borel et al. | 350/160 LC X |
| 3,950,233 | 4/1976 | Rosvold | 357/71 UX |

FOREIGN PATENT DOCUMENTS

| | | |
|---|---|---|
| 2,333,206 | 1/1974 | Germany. |
| 1,381,429 | 1/1975 | United Kingdom. |

*Primary Examiner*—Edward S. Bauer
*Attorney, Agent, or Firm*—H. Christoffersen; Birgit E. Morris

[57] ABSTRACT

A liquid crystal cell comprises two conductive glass plates sealed together by means of a glass frit seal along the edges of the plates in spaced apart relation to form an enclosure. A gap is left through the seal for filling the enclosure with a liquid crystal composition with a barrier behind the gap. Prior to filling, a continuous multimetal coating is sputtered so as to completely surround the gap. After the cell is filled, the gap is hermetically sealed by means of a fused solder seal bonded to the sputtered coating.

15 Claims, 5 Drawing Figures

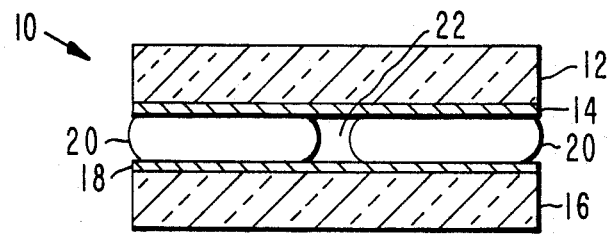
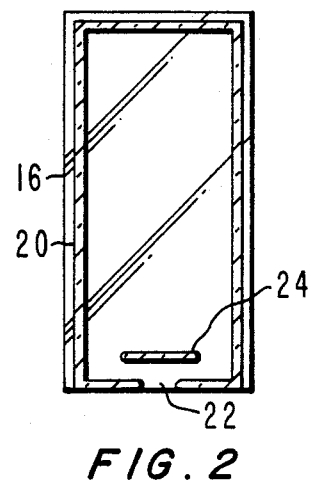 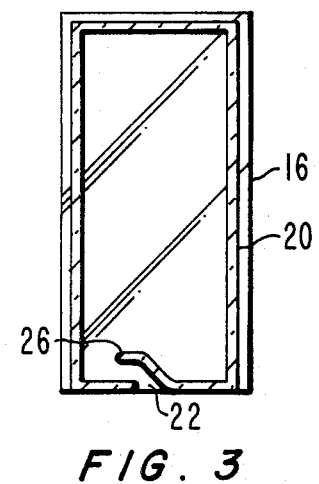
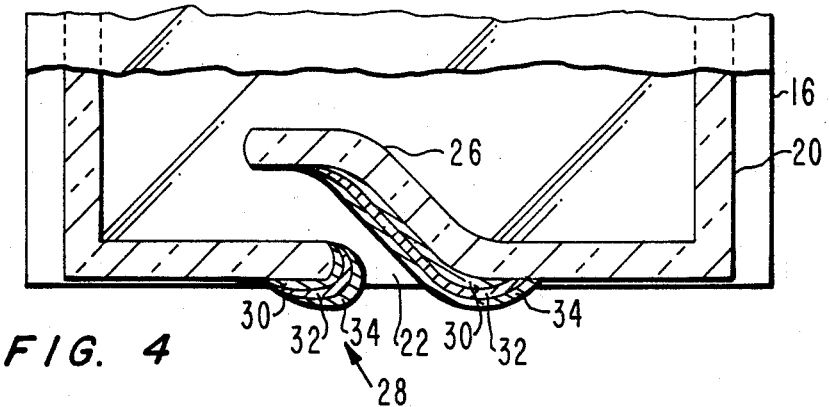
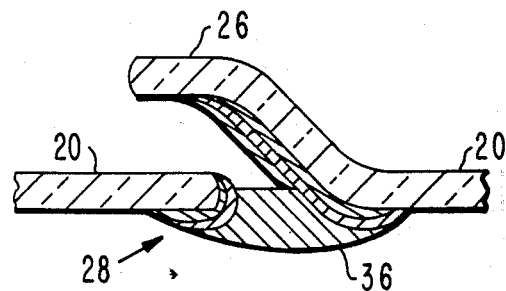

LIQUID CRYSTAL DEVICE AND METHOD FOR PREPARING SAME

This invention relates to liquid crystal devices having an improved seal and to a method for fabricating them.

BACKGROUND OF THE INVENTION

Known liquid crystal devices comprise two glass plate electrodes sealed together with a glass frit and a layer of liquid crystal material between them. The spacing between the plates is generally on the order of about 0.5 to 1 mil (13 to 25 microns). In order to provide devices having long life, the seal must be completely hermetic to prevent any impurities, particularly water or oxygen, from entering the cell and degrading the liquid crystal material, and to prevent leakage of the liquid crystal material, causing air bubbles which would detract from the appearance of the device.

The problem of obtaining a good seal is not simple any many prior art workers have devoted themselves to obtaining liquid crystal devices with hermetic seals by a reproducible, low cost process.

After the glass plates have been assembled, an opening or port must be available to fill the enclosure with the liquid crystal composition. Formerly, one or two holes were drilled in one of the plates leading to the interior spacing to provide such ports. After the cell was filled with the liquid crystal material, the ports were plugged with metal or epoxy. This method is unsatisfactory because it results in high glass breakage and the plug tends to be pushed out by any pressure inside the cell, such as that created by exposure to elevated temperatures. Further, it is extremely difficult to get a completely hermetic seal due to differences in expansion coefficients and the like between the glass and the metal or the plastic plug used.

In more recent processes, a gap spacing in the glass frit used to cement the plates together has been used to form the fill port for the liquid crystal material. This gap must then be sealed after the liquid crystal is introduced into the cell. Such a process is described in U.S. Pat. No. 3,751,137, which teaches that a conductive epoxy may be used to seal the cell; or an indium solder may be applied directly; or a metal film can be applied to the edge of the opening and covered by a solder. However, none of these sealing techniques has proven to be satisfactory because they do not completely hermetically seal the cells.

British Patent No. 1,381,428 describes closing a gap in a frit seal by providing a metal coating around the gap and soldering over the metal.

British Patent No. 1,381,077 describes another method for closing a gap in the frit seal whereby a vapor deposit of three metals, chromium, copper and gold, is sequentially applied to the opening which is then covered by solder. This method also has proven unsatisfactory because of strength and thermal expansion differences with the glass. Further, it is difficult to prevent the metal particles being vapor deposited from entering the cell, wherein they can aggregate causing shorts between the electrodes or unsightly metal deposits.

SUMMARY OF THE INVENTION

We have discovered a method for fabricating improved liquid crystal devices having a hermetic seal. A barrier is provided behind the glass frit gap used as a fill port, and a particular combination of metals is sputtered so as to surround but not close the port. The barrier serves to trap any metal entering the enclosure itself. After filling with liquid crystal, the gap or port is hermetically sealed with solder. This combination provides a reliable, hermetically sealed device.

BRIEF DESCRIPTION OF THE DRAWINGS

FIG. 1 is a side view of a liquid crystal cell enclosure having a gap in the seal.

FIG. 2 is a top view of the gap and a barrier behind the gap wherein the upper substrate is broken away.

FIG. 3 is a similar top view of the gap and a different barrier configuration which is integrated with the glass frit seal.

FIG. 4 is a top view of the gap which has a multilayer metal coating over the gap and the barrier behind it.

FIG. 5 is a top view of the metallized gap and a solder seal closing the gap.

DETAILED DESCRIPTION OF THE INVENTION

Referring to FIG. 1, a liquid crystal device 10 is shown comprising an upper glass plate 12 having a thin, transparent, conductive coating 14 thereon and a lower glass plate 16 having a thin, transparent, conductive coating 18 thereon sealed together at the edges by a glass frit seal 20, which has a gap 22. As is shown to those skilled in this art, a layer of silicon oxide can also be applied to the electrode layer to insure proper alignment of the liquid crystal composition.

The gap 22 is the fill port for liquid crystal material. The gap 22 communicates with the interior of the enclosure formed by the glass plates 12 and 16 and the frit seal 20.

FIG. 2 is a top plan view of the lower glass plate 16 having a glass frit strip 20 along the edges of the plate 16 except leaving a gap 22 and showing a strip barrier 24, also made of the glass frit, behind the gap 22.

FIG. 3 is a top plan view of the lower glass plate 16 also having a glass frit strip 20 along the edges of the plate 16 except leaving a gap 22 and forming an integrated barrier portion 26 behind the gap 22.

The fabrication of liquid crystal cells described above can be achieved by methods well known to those skilled in the art. Glass plates having conductive, transparent coatings thereon, such as indium-doped tin oxide coatings patterned in the form of the desired electrodes, and optionally having a slant evaporated silicon oxide layer thereon, are joined together by applying a glass frit strip along the edges of the lower plate so as to leave a gap and to form the barrier portion. A second plate overlies the lower plate, the second plate also having a conductive layer thereon and optionally a slant evaporated silicon oxide layer so that the glass frit strip is between the plates and the conductive coatings face each other. The assembled plates are then heated together under pressure to melt the glass frit, e.g., at a temperature of about 450°-500° C, sealing the plates together and forming an enclosure therebetween having a predetermined spacing, usually on the order of about one mil (25.4 microns). This seal is hermetic except for the intentional gap in the seal.

In the preferred embodiment, the glass frit strip 20 is applied close to the edge of the lower glass plate 16 on either side of the gap 22. Thus the metal coating will cover both the glass frit and the edge of the glass plates 12 and 16 and ensure that hermetic seals will be obtained reproducibly. This can be done by providing a slight bump of glass frit on both sides of the gap.

According to the present method, the next step is to sputter a multi-component metal film around the gap, but not closing it. Optionally, the surface of the gap can be briefly sputter etched to clean the surface prior to metallization. FIG. 4 is a top plan view of a portion of a liquid crystal cell with the upper glass plate 12 cut away showing a metal coating 28 comprising a first layer of titanium of chromium 30, a second layer of palladium or platinum 32 and a third layer of gold 34 completely surrounding the gap 22. The third layer is an optional layer. Sputtering is a well known metallization process whereby a target of the metal to be deposited is bombarded with ions of a plasma, such as argon ions, in a vacuum chamber. As the target is struck by the plasma ions, particles of the target are "sputtered" off the target and are directed toward the surface to be metallized. Sputtering has an advantage in the present application because, owing to the relatively short mean free paths of the sputtered particles through the plasma, the particles of metal arrive at the surface to be coated as a cloud or mass of particles moving in random directions and can thus deposit on surfaces which might otherwise be shadowed if only straight line paths from the target were followed, as in most evaporation processes. Thus, the coating 28 extends well into the gap 22 as shown in FIG. 4.

In the present application, the purpose of the barriers 24 (FIG. 2) or 26 (FIG. 3) is to provide a surface which captures the metal particles which are not collected in the gap 22 but go through the gap 22 to prevent these particles from entering the main enclosure of the liquid crystal cell. Metal particles inside the enclosure are undesirable since they can cause electrical shorting between the electrodes and they provide visible blemishes in the display. The barrier 24 is situate behind the gap but not closing it off from communication with the enclosure. The barrier 24 should be long enough so that it extends beyond each side of the gap 22 to insure that no metal particles work their way into the enclosure. The embodiment of FIG. 3, wherein the barrier 26 is integrated with the seal 20 is preferred because this barrier prevents any metal particles from entering the enclosure except in a single direction and thus further narrows the probability of metal particles moving past the barrier 24.

According to our preferred embodiment, the layer of titanium or chromium 30 can be from about 500 to 2,000 Å thick, a second layer of palladium 32 can be from about 3,000 to 7,000 Å thick; alternatively, a second layer of platinum 32 can be from about 2,000 to 7,000 Å thick, and the third layer of gold 34 can be from about 2,000 to 6,000 Å thick.

Titanium or chromium is employed as the first layer because they are strongly adherent to glass surfaces. Platinum or palladium are used as the second layer because they are readily wet by inexpensive and commercially-available solders, such as tin-lead solder, and because of their ductility at the required operating temperatures. Sufficient platinum or palladium must be applied so that a good bond will be obtained with the metal sealant. Gold can be employed as the last coating because it is chemically inert and readily wettable by solder and can serve to prevent contamination or oxidation of the platinum or palladium layer prior to subsequent soldering operations. The gold layer 34 is substantially absorbed by the solder during the solder fusion step. The gold layer 34 may be omitted when the cells are filled and sealed shortly after sputtering.

After providing the multimetal coating, the enclosure of the liquid crystal cell is filled with the desired liquid crystal composition. The cell is placed in a vacuum chamber and evacuated, immersed in the liquid crystal composition at a temperature so that the liquid crystal is in the isotropic state and then the vacuum is released. Atmospheric pressure forces the liquid crystal material into the enclosure so that it completely fills the cell. Since the liquid crystal is highly viscous, the meniscus will fill the gap 22 and even extend slightly beyond the gap 22. This is highly desirable since the liquid crystal material acts as a solder flux during the subsequent soldering step. Thus, there is no need to remove excess liquid crystal material from the gap area which could lead to contamination of the liquid crystal or to undesirable gas pockets in the cell enclosure.

After cooling the cells to room temperature, the gap 22 is then hermetically sealed by fusing a metal closure member 36 (FIG. 5) to the metal coating 28 and over the gap 22. The metal closure preferred herein is a solder which can be applied in known manner by drawing the tip of a soldering iron having a film of solder thereon across the metal coating 28. The solder transfers to the metal film 28, and bonds tightly to the palladium or platinum metal layer. Any excess liquid crystal serves as a flux during soldering. The resultant solder body is firmly fusion bonded to the metal coating 28 and hermetically seals the enclosure with a continuous and uninterrupted seal. FIG. 5 is a top view of the gap 22 showing the solder seal 36 fusion bonded to the metal coating 28.

We claim:
1. A liquid crystal device comprising
two closely spaced glass plates having a conductive layer thereon on facing sides thereof maintained apart with a seal to define an enclosure therebetween and containing a liquid crystal composition filling said enclosure, said seal comprising
a glass strip having a gap along the periphery of said glass plates,
a barrier portion behind said gap,
a multi-component metal coating within said gap but not closing it formed by sputtering in sequence a first layer of titanium or chromium and a second layer of platinum or palladium, and
a layer of solder fused to said metal coating and completely closing said gap.

2. A device according to claim 1 wherein a third layer of gold is sputtered within said gap.

3. A device according to claim 2 wherein said gold layer is from about 2,000 to 6,000 angstroms thick.

4. A device according to claim 1 wherein said first layer is a titanium layer from about 500 to 2,000 angstroms thick.

5. A device according to claim 1 wherein said second layer is palladium having a thickness of about 3,000 to 7,000 angstroms.

6. A device according to claim 1 wherein said second layer is platinum having a thickness of about 2,000 to 7,000 angstroms thick.

7. A method of fabricating a liquid crystal cell which comprises
a. applying a glass frit strip along the periphery of a glass plate having a transparent, conductive coating thereon over said conductive coating, leaving a small gap and providing a barrier portion behind said gap,
b. overlaying a second glass plate having a conductive layer thereon so that its edges extend at least to the outer edge of said glass frit strip and said conductive layers are in facing relation,
c. heating said glass plates together under pressure to melt the glass frit and define an enclosure between said plates,
d. sputtering titanium or chromium to form a first layer over and within said gap,
e. sputtering a second layer of palladium or platinum onto said first layer,
f. evacuating the enclosure formed by said plates,
g. filling said enclosure with a liquid crystal composition, and
h. fusion sealing said gap with a metal sealant.

8. A method according to claim 7 wherein a third layer of gold is sputtered onto said second layer.

9. A method according to claim 8 wherein said gold layer is from about 2,000 to 6,000 angstroms thick.

10. A method according to claim 7 wherein said first layer is a titanium layer from about 500 t0 2,000 angstroms thick.

11. A method according to claim 10 wherein said second layer is palladium about 3,000 to 7,000 angstroms thick.

12. A method according to claim 10 wherein said second layer is platinum about 2,000 to 7,000 angstroms thick.

13. A method according to claim 7 wherein said metal sealant is a tin-lead solder.

14. A method according to claim 7 wherein a slant evaporated silicon oxide coating is applied to the transparent conductive coatings.

15. A method according to claim 7 wherein said glass frit strip extends to the outer edge of said glass plate on either side of said gap.

* * * * *